UNITED STATES PATENT OFFICE.

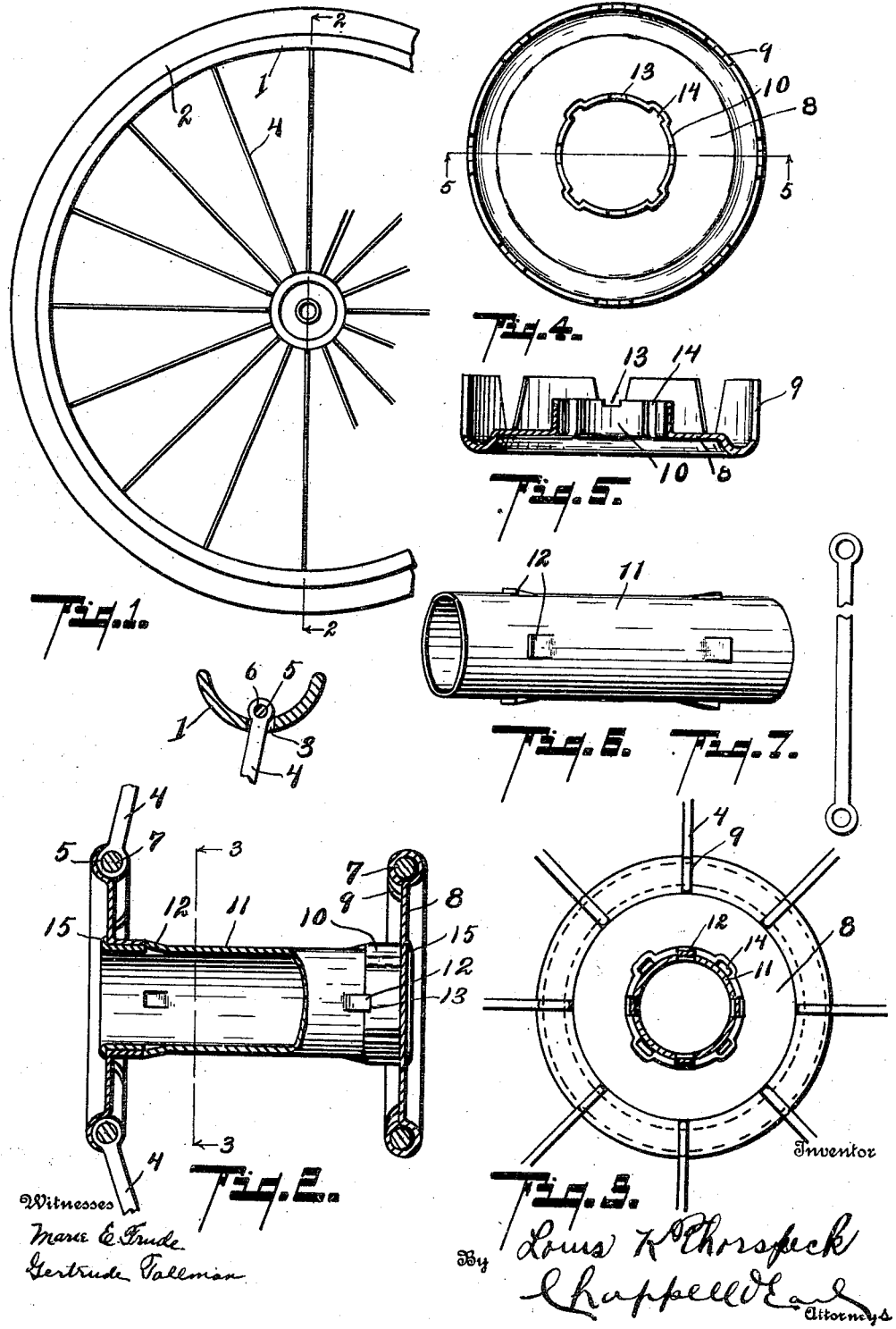

LOUIS K. THORSPECK, OF SOUTH HAVEN, MICHIGAN.

WHEEL.

972,485.  Specification of Letters Patent.  Patented Oct. 11, 1910.

Application filed September 2, 1909. Serial No. 515,801.

*To all whom it may concern:*

Be it known that I, LOUIS K. THORSPECK, a citizen of the United States, residing at South Haven, county of Van Buren, State of Michigan, have invented certain new and useful Improvements in Wheels, of which the following is a specification.

This invention relates to improvements in wheels.

The invention relates particularly to metal wheels adapted for use on light vehicles such as children's carriages and the like, although certain features thereof are desirable for use on heavy wheels.

The main objects of this invention are, first, to provide a wheel of the class described which is very economical in structure and at the same time is very strong and durable. Second, to provide an improved metal wheel having few parts in which the parts are simple in structure and easily assembled. Third, to provide an improved metal wheel which can be very quickly and easily assembled and proper tension applied to the parts. Fourth, to provide in a wheel an improved means for securing the spokes to the hub. Fifth, to provide in a wheel an improved hub construction.

Figure 1 is a detailed side elevation of a structure embodying the features of my invention. Fig. 2 is an enlarged detail view partially in vertical section taken on a line corresponding to line 2—2 of Fig. 1. Fig. 3 is a detail section taken on a line corresponding to line 3—3 of Fig. 2. Fig. 4 is an inside view of one of the hub flanges before it has been clamped on the spoke securing ring. Fig. 5 is a sectional view taken on a line corresponding to line 5—5 of Fig. 4. Fig. 6 is a perspective view of the barrel of my improved hub. Fig. 7 is a detail view of one of the spokes of my improved wheel formed from flat metal.

In the drawing, similar numerals of reference refer to similar parts throughout the several views, and the sectional views are taken looking in the direction of the little arrows at the ends of the section lines.

Referring to the drawing, the rim 1 of my improved wheel is preferably of channel form as illustrated and adapted to receive a cushion tire as 2. The rim 1 is provided with spoke openings 3 through which the outer ends of the spokes 4 are inserted. The spokes 4 are provided with eyes 5 at each end. The spokes are secured to the rim by arranging the wire or rod 6 through the eyes 5 in the outer ends of the spokes after the spokes have been inserted in the rim openings 3. The rod or wire 6 is preferably common to all of the spokes and the ends may be brazed together if desired, making the same into a continuous ring. The tire 2 is arranged in the channel over the ends of the spokes and the securing rod or wire so that the spokes and the securing rod are covered thereby. This forms a very simple and effective means for securing the spokes to the rim.

The spokes 4 are formed from flat metal, punching the eyes in the opposite ends thereof. This enables me to readily manufacture any number of spokes of exactly the same length. This is of great advantage, as will be observed when the method of assembling the wheel is taken into consideration, as it insures perfectly true wheels, without any special forming or shaping of the same afterward. When I say the spokes are formed from flat metal, I wish that to be understood as including wire that may be properly flattened to enable the punching of the eyes for the securing of the ends of the spokes to the hub and the rim.

A pair of wire rings 7 are provided, each ring being arranged through the eyes in the inner ends of alternate spokes. The hub flanges 8 are beaded or clamped over the rings 7 and thus by the rings the spokes are effectively secured to the flanges. The flanges are slotted at 9 to receive the spokes so that the spokes are held in a suitably spaced relation and clamped against lateral movement on the rings 7. The flanges 8 are preferably provided with sleeve portions 10 which project inwardly to embrace the hub barrel 11. This hub barrel 11 is provided with outwardly projecting lug like flange spacing members 12 which are adapted to engage the flanges and hold them in a spaced relation. The flanges are preferably provided with notches 13 to receive the spacing lugs so that the parts are secured together— that is, the hub and the flanges are connected so that they cannot turn or move relative to each other. One of the hub flanges is preferably provided with grooves 14 to receive the lugs 12 which permits the introduction of the hub barrel through the flange. The flanges are preferably secured upon the hub barrel by turning the outer ends of the barrel up as at 15, see Fig. 2. This is preferably done by spinning out the ends of the hub members which secures a smooth finish and also clamps the flanges against the spacing members 12.

In assembling the wheel the spokes are first laced on the rings 7, each ring preferably being inserted through the eyes of alternate spokes. The rings are then secured to the hub flanges which are preferably formed as illustrated in Figs. 4 and 5, in which condition they are adapted to receive the rings and be folded or clamped upon the same as is clearly shown in Fig. 2, the work being preferably done by an upsetting device. The spokes are then secured to the rim. The hub barrel is then inserted and the flanges spread to apply tension to the spokes, the hub barrel member inserted through the flange provided with the grooves 14 and turned to position to engage the notches 13 in the flanges. The flange spreading device is then released to allow the flanges to move against the spacing lugs of the hub barrel member and the ends of the barrels are spun up or upset as indicated at 15, the structure is thus completed and all of the spokes are properly tensioned. This can be very quickly and easily done and the desired tension secured upon all the spokes by a simple operation.

The parts of my improved wheel are very simple and economical to produce and the same may be very readily assembled as indicated, and when assembled produce a structure which is very strong and all of the spokes equally tensioned so that the wheel is capable of withstanding very heavy loads.

My improved wheel is light in weight, and at the same time, very strong and durable. As stated, the same is very economical in form and are quickly and easily assembled.

Having thus described my invention, what I claim as new and desire to secure by Letters Patent is:

1. A wheel comprising a channel rim having spoke openings therethrough: spokes punched from flat metal having eyes at each end thereof arranged through said openings; a spoke securing rod arranged in the channel of said rim through the eyes in the outer ends of said spokes; a pair of hub flange rings, each ring being arranged through the eyes in the inner ends of alternate spokes; a hub barrel having flange-engaging lugs toward each end thereof; and hub flanges provided with inwardly-projecting sleeves, said flanges being beaded about said rings and slotted to receive said spokes, the inner ends of said flange sleeves being notched to receive said lugs on said barrel, one of the sleeves being provided with internal longitudinal grooves adapted to receive the said lugs on said barrel, the outer ends of said barrel being turned outwardly to engage and retain the said flanges thereon.

2. A wheel comprising spokes having eyes in their inner ends; a pair of hub flange rings, each ring being arranged through the eyes in the inner ends of alternate spokes; a hub barrel having flange-engaging lugs toward each end thereof; and hub flanges provided with inwardly-projecting sleeves, said flanges being beaded about said rings and slotted to receive said spokes, the inner ends of said flange sleeves being notched to receive said lugs on said barrel, one of the sleeves being provided with internal longitudinal grooves adapted to receive the said lugs on said barrel, the outer ends of said barrel being turned outwardly to engage and retain the said flanges thereon.

3. A wheel comprising spokes having eyes in their inner ends; a pair of hub flange rings, each ring being arranged through the eyes in the inner ends of alternate spokes; a hub barrel having flange-engaging lugs toward each end thereof; and hub flanges provided with inwardly-projecting sleeves, said flanges being beaded about said rings and slotted to receive said spokes, the inner ends of said flange sleeves being notched to receive said lugs on said barrel, one of the sleeves being provided with internal longitudinal grooves adapted to receive the said lugs on said barrel.

4. In a wheel, the combination of a rim of channel form containing perforations for the spokes; a rubber tire to fit the rim; a pair of flanges forming hub ends; rings retained on said flanges by suitable fingers folded around the same; spokes punched from metal having eyes at each end; wire fastening means arranged through the eyes in the outer ends of said spokes, where they are extended into the said channel, the rings on the said hub flanges being threaded through the inner ends of the spokes; a hub barrel inserted through said flanges with suitable engaging means for engaging the said hub flanges to hold the same separated and put stress on the said spokes.

5. The combination in a wheel of a suitable rim perforated to receive spokes; a suitable hub structure with flanges toward each end;

spokes punched from flat metal with eyes at each end; suitable retaining wires for insertion through the said eyes in the ends of said spokes, both at the hub and at the rim; means for putting stress on the said spokes by separating the said hub flanges; and means securing them in place, coacting for the purpose specified.

In witness whereof, I have hereunto set my hand and seal in the presence of two witnesses.

LOUIS K. THORSPECK. [L. S.]

Witnesses:
H. T. Cook,
Will Mersore.